Nov. 21, 1967   H. V. WILLIAMSON ET AL   3,353,550
SYSTEM FOR CONTROLLING FLOW AND PROPORTIONING LIQUIDS
Filed Oct. 21, 1963   4 Sheets-Sheet 1
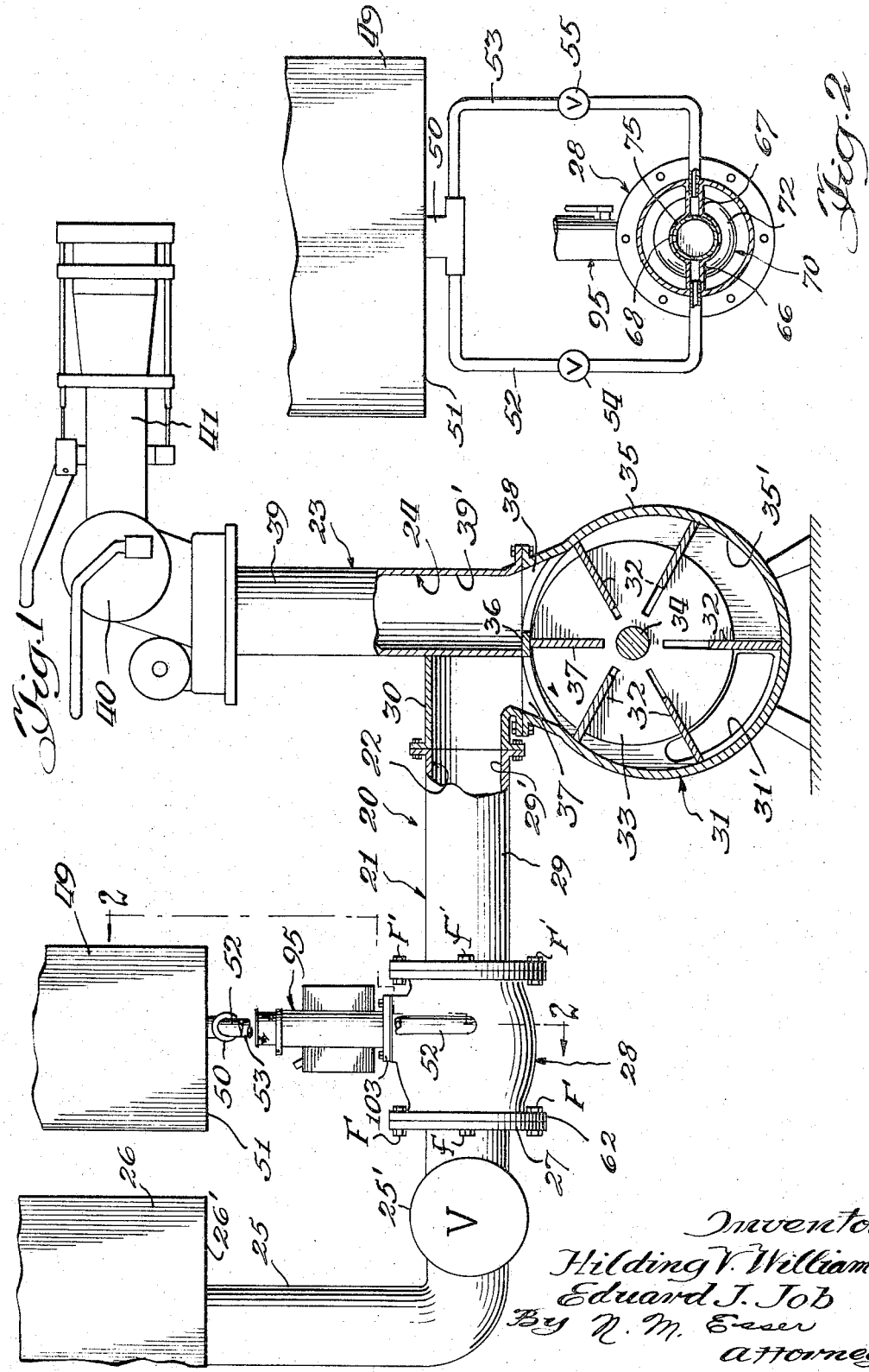

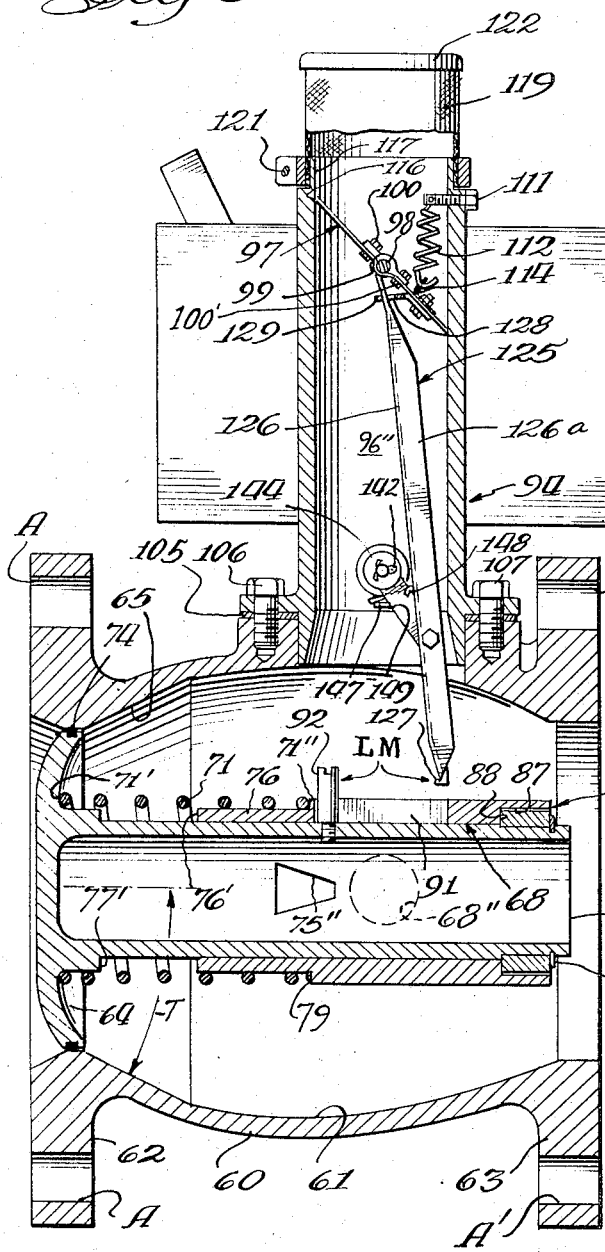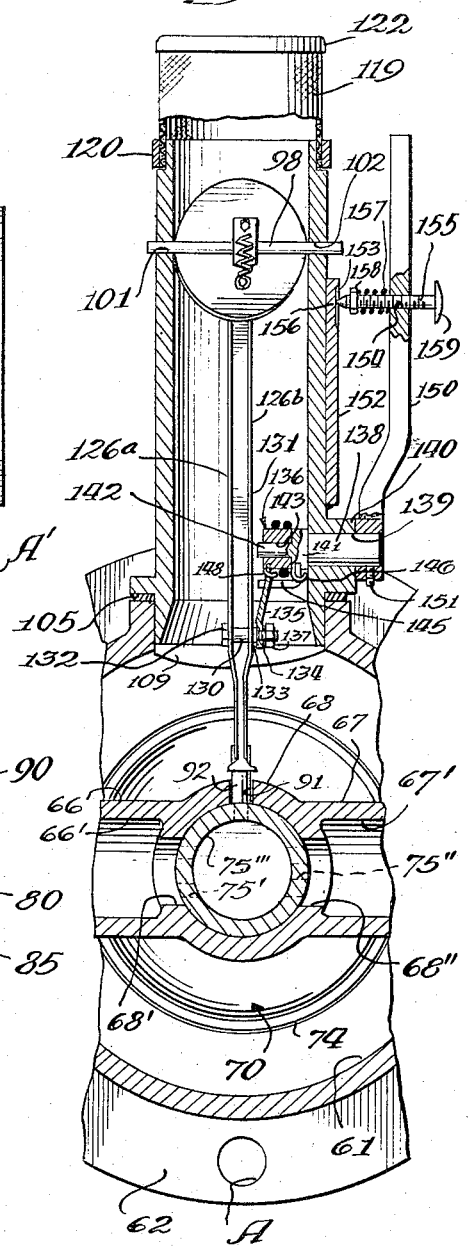

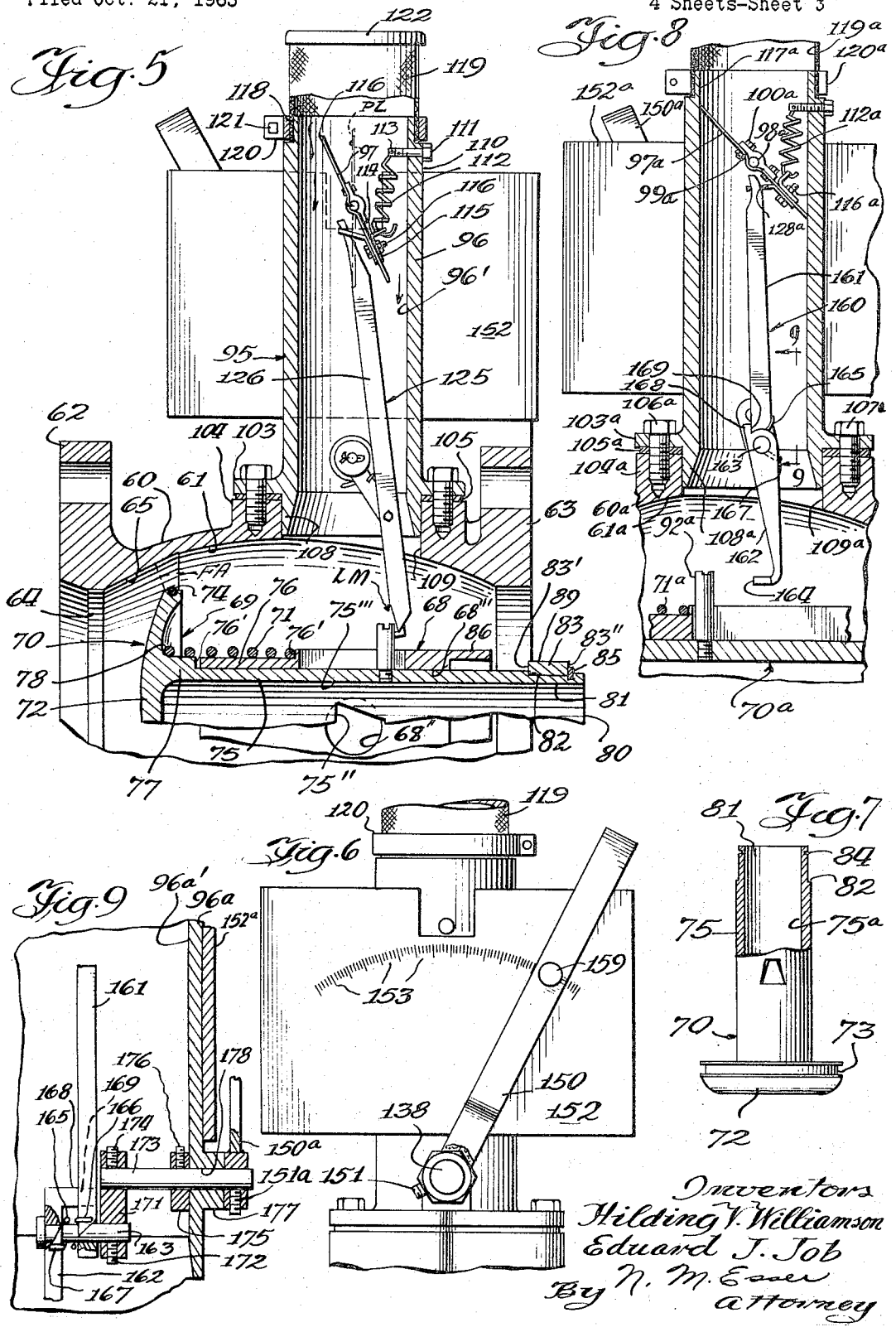

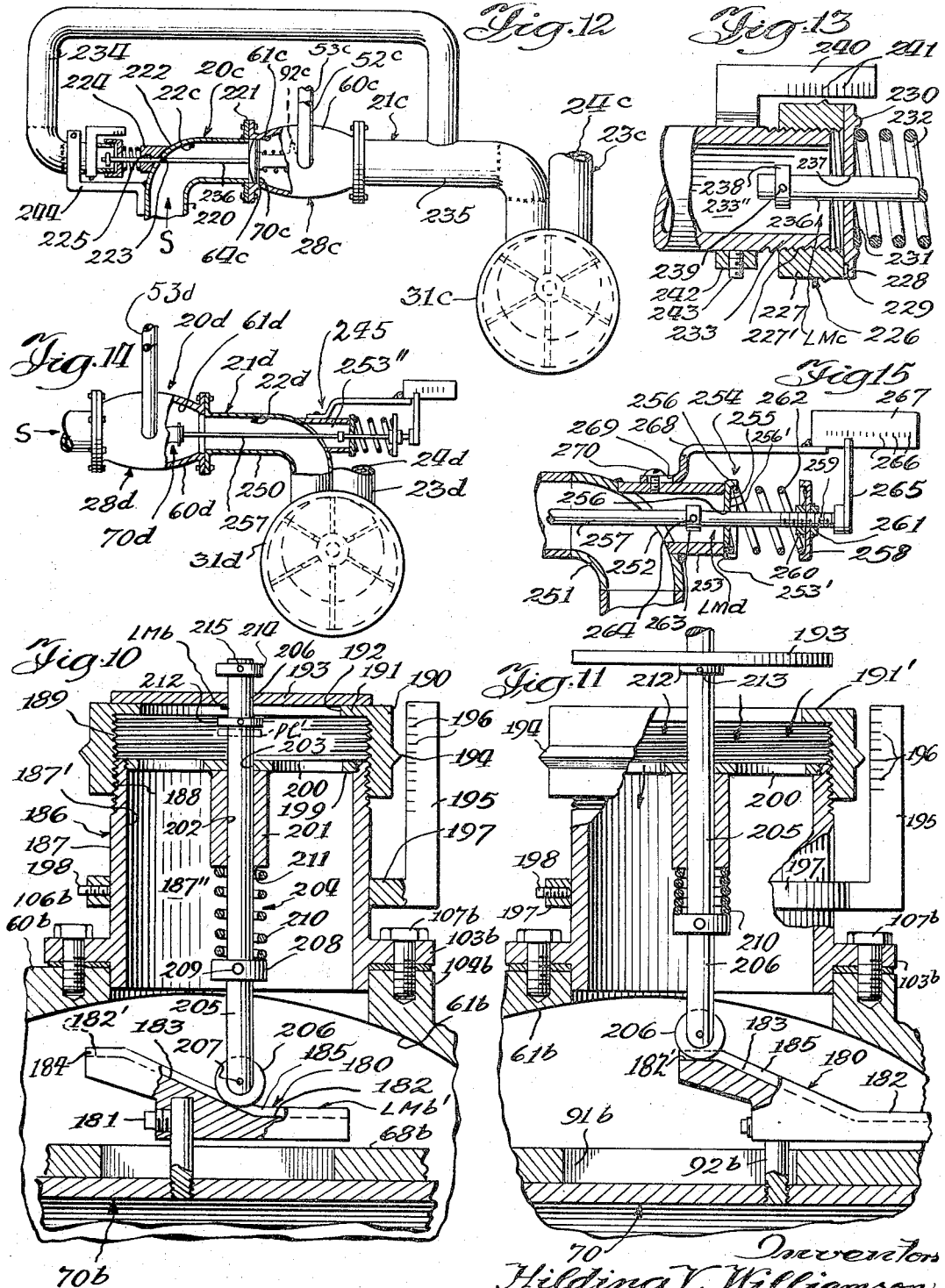

United States Patent Office 3,353,550
Patented Nov. 21, 1967

3,353,550
SYSTEM FOR CONTROLLING FLOW AND PROPORTIONING LIQUIDS
Hilding V. Williamson and Eduard J. Job, Chicago, Ill., assignors to Chemetron Corporation, Chicago, Ill., a corporation of Delaware
Filed Oct. 21, 1963, Ser. No. 317,542
8 Claims. (Cl. 137—114)

This invention relates in general to a flow system and in particular to a flow control device for limiting fluid flow to a preselected level and for proportioning fluids.

Although the invention is useful generally for limiting fluid flow or for both limiting fluid flow and proportioning fluids, the invention is particularly useful in the firefighting field, where it is known to employ foam to smother fires. The foam is typically sprayed from a discharge nozzle of a flow system. In a typical flow system, two fluids such as water and a foam stabilizing agent are volumetrically proportioned and mixed with gaseous fluid such as air to form foam.

By employing the method and system of the invention, various expansion ratios can be obtained. The expression "expansion ratio" as applied to foam refers to the ratio of the volume of a foam medium to the volume of a mixture of foam stabilizing agent and aqueous medium. For example, if twelve gallons of air are combined with one gallon of foam stabilizing agent and water to produce thirteen gallons of foam, the expansion ratio is thirteen-to-one.

It is a purpose of the invention to provide an improved flow control device which is useful to limit fluid medium flow to a preselected level by limiting the amount of suction in the flow system; a gaseous fluid, for example ambient air, is bled into the flow system upstream of a suction creating means when the fluid medium flow exceeds a preselected level. This reduces the suction upstream of the suction creating means and consequently reduces the fluid flow to the preselected level.

It is a feature of the invention to provide a device for controlling flow in a flow system which includes a flow-responsive element which responds to changes in fluid flow. The flow-responsive element operates a gaseous fluid bleed valve for bleeding a gaseous fluid into a passage means of a conduit means which is connected to a suction creating means.

It is another feature of the invention to provide a flow control device having a movable flow-responsive element connected to a movable valve element of a gaseous fluid bleed valve by a lost-motion connection.

It is another feature of the invention to provide a flow control device having a movable flow-responsive element which does not open an associated bleed valve until a preselected flow is exceeded. When the preselected fluid flow is exceeded, the bleed valve is progressively actuated by an actuating mechanism toward the open position in response to progressive movement of the flow-responsive element. Since the leverage of the actuating mechanism is relatively great, a relatively small movement of the flow-responsive element beyond the preselected fluid flow level at which the device is set will effect opening of the bleed valve to a considerable extent. It is therefore readily apparent that the device is quite sensitive and substantially instantaneously reduces excess suction in the system to thereby limit the fluid flow to the preselected level.

It is another feature of the invention to provide a flow control device having a movable flow-responsive element and a bleed valve selectively operable by the flow-responsive element, wherein damage to the device is avoided in spite of excess travel of the flow-responsive element.

It is another feature of the invention to provide a flow control device for limiting fluid flow and for proportioning fluids having a flow-responsive element. The flow-responsive element, disposed in a passage of the device, includes a valve member having a port movable into and out of increased registry with a port of a valve body in such a manner that a first fluid medium flowing through the device past the flow-responsive element and a second fluid medium passing through the ports into the passage maintain substantially the same volumetric proportion relative to each other. Alignment of the ports is insured by a pin movable in an elongated slot in the valve body. The pin also serves to operate an operating mechanism after sufficient movement of the flow-responsive element. The operating mechanism is operatively connected to a movable valve element of a gaseous fluid bleed valve. Should the fluid flow sensed by the flow-responsive element exceed a preselected level, the pin will operate the operating mechanism which in turn will operate the movable valve element to bleed gaseous fluid into the passage to reduce the suction in the passage. Reduction of the suction will reduce the fluid flow to the preselected level.

It is another feature of the invention to provide a method and flow control device which serve both to limit flow and to proportion two fluids, which at the same time is dependable in its operation and is relatively simple and economical to construct.

In the diagrammatic, illustrative drawings:

FIGURE 1 is a side elevational view, partly in cross-section, showing a flow system employing a flow control device of one embodiment of the invention;

FIGURE 2 is a cross-sectional view taken along line 2—2 of FIGURE 1;

FIGURE 3 is a cross-sectional side elevational view of the flow control device with both a movable valve element of a bleed valve and a flow-responsive element in their closed positions, with one form of operating mechanism operatively connected to the movable valve element;

FIGURE 4 is a cross-sectional view of the device also shown in FIGURES 1, 2, and 3;

FIGURE 5 is a side elevational view, mainly in cross-section, of the device also shown in FIGURES 1 through 4, with both the flow-responsive element and the movable valve element shown to be in their partly open positions;

FIGURE 6 is a fragmentary side elevational view of the device showing in particular a plate having graduation grooves thereon and an adjusting arm;

FIGURE 7 is an elevational view, partly in cross-section, showing the flow-responsive element, also shown in FIGURES 2 through 5, on a reduced scale;

FIGURE 8 is a cross-sectional view, showing a fragmentary portion of a device like that shown in FIGURES 1 through 7 but showing an alternative form of operating mechanism;

FIGURE 9 is a cross-sectional view taken along line 9—9 of FIGURE 8;

FIGURE 10 is a cross-sectional elevational view showing a fragment of the flow control and proportioning device shown in the embodiment of FIGURES 1 through 7 but showing an alternative form of a bleed valve and operating mechanism, with a movable valve element shown to be in the fully closed position;

FIGURE 11 is a cross-sectional elevational view similar to FIGURE 10 but showing the movable valve element in the fully open position;

FIGURE 12 is a side elevational view, partly in cross-section, of a flow system embodying an alternative form of a bleed valve and operating mechanism;

FIGURE 13 is an enlarged side elevational view showing in detail the bleed valve and a fragmentary portion of the operating mechanism also shown in FIGURE 12;

FIGURE 14 is a side elevational view, partly in cross-section, of a flow system embodying an alternative form of the bleed valve and operating mechanism; and FIGURE 15 is an enlarged side elevational view showing in detail the bleed valve and a fragmentary portion of the operating mechanism also shown in FIGURE 14.

Referring now to the embodiment of FIGURES 1 through 7 of the illustrative drawings, there is shown a flow system generally indicated at 20 which includes intake conduit means generally indicated at 21 having intake passage means generally indicated at 22 and discharge conduit means generally indicated at 24. The conduit means 21 is shown to include a conduit 25 connected at one end to what is shown to be a bottom 26' of a tank 26 containing a first fluid medium supply source. Disposed along the conduit 25 is a manually operable valve 25'. The other end of the conduit 25 has a flange 27. Fasteners F are shown to be employed to connect the flange 27 to a flow control device generally indicated at 28 which serves both to limit fluid and to proportion fluids volumetrically over a range. The intake conduit means 21 also includes a conduit 29 having a passage 29' connected at one end to the device 28 and at the other end to a pump inlet connection 30. The pump inlet connection 30 is shown to be connected to a vane-type positive displacement pump 31 having radial vanes 32. The pump 31 is shown to have an air inlet 31'. The vanes 32 are mounted for generally radial reciprocating movement in a rotor 33 mounted on a shaft 34. The shaft 34, which extends through a housing 35 of the pump 31, is driven for example by a variable speed gasoline or electric motor (not shown). The vanes 32 sweep across an annular inner surface 35' of the housing 35. A partition 36 is shown to partially define an intake port 37 and a discharge port 38. Although a positive displacement vane-type pump 31 is illustrated, any pump capable of creating a suitable suction is employable.

The discharge conduit means 23 is shown to include a conduit 39 having a passage 39' in fluid communication with the discharge port 38 of the pump 31. The conduit means 23 also includes a turret 40 having a discharge nozzle 41.

With reference to both FIGURES 1 and 2, there is shown a fragmentary portion of a tank 49 for containing a second fluid medium supply source, for example a foaming stabilizing agent. A T-fitting 50 connected to a bottom 51 of the tank 49 is shown to branch into conduits 52 and 53 having respective valves 54 and 55. The bottom 26' of the tank 26 is shown to be at the same level as the bottom 51 of the tank 49. The conduits 52 and 53 are shown to be threadably received by the flow control device 28.

The flow control device 28 of the embodiment of FIGURES 1 through 7 is shown to include a housing 60 having an open-ended longitudinal passage 61. The housing 60 is shown to have flanges 62 and 63 at opposite ends. The flanges 62 and 63 each have a plurality of apertures A and A' for receiving respective fasteners F and F'. The flow control and proportioning device 28 forms a part of the conduit means 21 when the conduits 25 and 29 are connected to it as shown in FIGURE 1, and when so connected the passage 61 forms a part of the passage means 22.

The passage 61 is shown to have a port 64 which leads into a frusto-conical passage portion 65 preferably but not necessarily having a taper T of 26°. Formed integrally with the housing 60 are a pair of opposed conduit members 66 and 67 which are shown to extend in a generally radial inward direction from the housing 60. The conduit members 66 and 67 have passages 66' and 67', respectively. The conduits 52 and 53 are threadably secured in the marginal ends of the conduit members 66 and 67, respectively. The conduit members 66 and 67 join and rigidly position a tubular valve body generally indicated at 68 having ports 68' and 68" in communication with the passages 66' and 67', respectively.

A flow-responsive mechanism generally indicated at 69 is shown to include a flow-responsive element generally indicated at 70 and a compression spring 71. The flow-responsive element 70 has a head 72 having a circumferential groove 73 at its periphery. An O-ring 74 is shown in FIGURES 3 and 5 to be received in the circumferential groove 73. When the head 72 of the flow-responsive element 70 is in the position shown in FIGURE 3, the O-ring 74 bears against the port 64 to seal off flow. When the head 72 of the flow-responsive element 70 is in the position shown in FIGURE 5, the fluid medium is capable of flowing through a variable size flow area FA defined by the periphery of the head 72 and the frusto-conical passage portion 65. The flow responsive element 70 also includes a tubular valve element 75 which is slidably received in a bore 68''' of the valve body 68. One marginal end of the spring 71 encircles a circular tubular portion 76 of the valve body 68 and the other marginal end of the spring 71 encircles a circular tubular portion 77 of the valve element 75. One terminal end 71' of the compression spring 71 bears against an external shoulder 78 formed at the joinder of the head 72 and the tubular valve element 75. The other terminal end 71" of the spring 71 bears against an external shoulder 79 of the valve body 68. The circular tubular portion 76 of the valve body 68 terminates at an annular stop face 76', while the enlarged circular tubular portion 77 terminates at an annular stop face 77'. The flow-responsive element 70 reaches its fully open position when its stop face 77' abuts against the stop face 76' of the valve body 68.

The tubular valve element 75 has a passage 75''' which terminates at one end at the head 72 and opens at its other end at a discharge opening 80. A marginal end 81 of the valve element 75 extends to the discharge opening 80. The marginal end 81 has an external annular shoulder 82. An annular sleeve 83 encircles a portion of the marginal end 81 and is abuttable against the shoulder 82 at its one end 83'. What is shown to be a continuous annular external groove 84 is spaced a short distance from the discharge end 80. A C-ring 85 is shown to be received in the groove 84 and to abut the other end 83" of the sleeve 83. Therefore, the sleeve 83 is prevented from moving relative to the valve element 75 by the shoulder 82 and the C-ring 85. The valve body 68 is provided at its marginal end with what is shown to be a continuous annular bore 87 which terminates at one end at an internal stop face 88. As best shown in FIGURE 3 of the illustrative drawings, there is a slight clearance between an outer surface 89 of the sleeve 83 and the bore 87. When the flow-responsive element 70 moves for example from the position shown in FIGURE 5 toward the position shown in FIGURE 3 as a result of a sudden and extensive reduction of suction, the one end 83' of the sleeve 83 will enter the bore 87, and the fluid medium, for example water, trapped between the sleeve 83 and the bore 87 will start to escape. The clearance space between the sleeve 83 and the bore 87 affords relatively gradual escape for the water. The bore 87 and the sleeve 83, therefore, define a dashpot generally indicated at 90.

The valve body 68 has an elongated slot 91 which extends in a longitudinal direction. A pin 92, which is considered to form a part of the flow-responsive element 70, is shown to be threadably secured in the movable valve element 75 of the flow-responsive element 70. Only sufficient clearance between the slot 91 and the pin 92 is provided to obviate binding. The pin 92 prevents rotation of the valve element 75 in the bore 68''' of the valve body 68. The pin 92 is not employed as a stop for the flow-responsive element 70; however, the elongated slot 91 is of a character to be proportioned in length and so located that the pin 92 would serve as a stop when it engaged one or both ends of the slot 91.

There is provided a gaseous fluid bleed mechanism generally indicated at 94 for bleeding a gaseous fluid, specifically ambient air, into the passage 61. The term "gaseous fluid" is intended to include not only ambient atmospheric air but also other suitable gases at atmospheric or other suitable pressures. The mechanism 94 includes a bleed valve generally indicated at 95 mounted on the housing 60. The bleed valve 95 is shown to include a tubular, vertically upwardly extending valve body 96 having an inner surface 96' which defines a passage 96", and a movable valve element 97 of the butterfly type. The movable valve element 97 is shown to be securely mounted on a pivot pin 98 by means of a clamp 99 and threaded fasteners 100 and 100'. The pivot pin 98 is rotatably mounted in opposed apertures 101 and 102 in the valve body 96.

The valve body 96 is shown to have an external mounting flange 103 at its lower end, and the housing 60 is shown to have a continuous upstanding boss 104. A gasket 105 is sandwiched between the external flange 103 and the boss 104. Spaced bolts 106 and 107 pass through the flange 103 and are threadably received in the boss 104. Tightening of the bolts 106 and 107 serves to compress the gasket 105 to insure a fluid-tight seal between the flange 103 and the boss 104. A lower marginal end 108 of the valve body 96 is received by a bore 109 in the housing 60. The bore 109 opens into the passage 61.

The upper marginal end 110 of the valve body 96 is shown to have a threaded bolt 111 passing therethrough and extending into the passage 96". One end of a tension spring 112 passes through an aperture 113 in the bolt 111 and the other end of the tension spring 112 passes through an aperture 114 in a bracket 115. The bracket 115 is mounted on the movable valve element 97 by means of a threaded fastener 116. The tension spring 112 serves to urge the movable valve element 97 into the closed position as shown in FIGURES 3 and 4. An edge 116 of the movable valve element 97 is appropriately shaped so that when the movable valve element 97 is in the closed position, it will conform to the inner surface 96' of the valve body 96.

The upper marginal end 110 of the valve body 96 is shown to have an externally reduced portion 117. A lower marginal end 118 of an air filter 119 is received around the reduced portion 117. A clamp 120 is shown to clamp the lower marginal end 118 of the air filter 119 to the reduced portion 117 upon tightening of a threaded fastener 121. The upper end of the filter 119 is closed off by a plate 122. The filter 119 is made of a suitable size mesh material to prevent foreign objects and debris from entering the passage 96".

There is shown in detail in FIGURES 3 through 6 of the drawings an operating mechanism generally indicated at 125 for operating the movable valve element 97 of the bleed valve 96 in response to sufficient movement of the flow-responsive element 70. The operating mechanism 125 of the embodiment of FIGURES 1 through 7 is shown to include an operating member 126 which is shown to have a channel-shaped cross section throughout the majority of its length. One end of the operating member 126 is shown to have a relatively wide abutment face 127 which is engageable by the pin 92 of the flow-responsive element 70 as shown in FIGURE 5. The pin 92 only abuts the abutment face 127 of the operating member 126 after sufficient movement of the flow-responsive element 70. The movement of the pin 92 toward and away from the abutment face 127 before the abutment face 127 is engaged in "lost motion." So, therefore, the connection between the pin 92 and the abutment face 127 is a lost-motion connection generally indicated at LM. The other end of the operating member 126 is shown to pass through an aperture 128 in a bracket 129 which is secured to the movable valve element 97 by the threaded fastener 116.

A pivot pin 130 passes transversely through the operating member 126 somewhat below its longitudinal midpoint. The pivot pin 130 has an enlarged head 132 which bears against one leg 126a of the operating member 126.

The pivot pin 130 also receives a washer 133 which bears against a leg 126b of the operating member 126. The washer 133 and a washer 134 straddle an arm 135 of a pivot pin mounting assembly generally indicated at 136. A nut 137 bears against the washer 134 and prevents the pivot pin 130 from shifting. The pivot pin mounting assembly 136 includes a shaft or pin 138 which is pivotally received in a bore 139 of an external boss 140 formed integrally with the valve body 96. The pin 138 is held against pivotal movement except for purposes of adjustment. The pin 138 has an enlarged portion 141 which bears against the inner surface 96' of the valve body 96 to prevent the pin 138 from shifting outwardly of the bore 139. The marginal end of the pin 138 is shown to have a reduced portion 142 which terminates at the enlarged portion 141. Welded to the enlarged portion 141 is an angle-shaped arm 145 which extends outwardly of the enlarged portion 141 and in the same direction as the reduced portion 142. One end 146 of a spiral spring 147 is shown to be hooked partially around the arm 145 and an opposite end 148 of the spiral spring 147 is shown to be hooked partially around the arm 135. The spring 147 is shown to urge the arm 135 into abutment with an abutment face 149 of the arm 145.

An adjusting arm 150 is mounted on the pin 138 and is held against relative movement with respect thereto by a set screw 151. A plate 152 having a scale 153 disposed along an arc of a circle is connected to the valve body 96 preferably by welding. Suitable indicia (not shown) are provided on the plate 152 adjacent the scale 153 so that the fluid flow through the passage 61 can be readily adjusted to a preselected level. The scale 153 may take the form of grooves or recesses, one of which is detailed in FIGURE 4. The adjusting arm 150 has an aperture 154 through which a screw 155 passes. The screw 155 has a pointed end 156 shown in FIGURE 4 to be engaged or nested in one of the graduation grooves 153. A compression spring 157 encircles a portion of the screw 155. One end of the compression pring 157 bears against the adjusting arm 150 and the other end of the compression spring 157 bears against a nut 158 threadably received by the screw 155. The end of the screw 155 opposite the point 156 has a head 159 which enables the screw 155 to be manually moved sufficiently so that the pointed end 156 can be caused to move out of one graduation groove 153 whereupon the arm 150 is free to be repositioned. When the pointed end of the screw 155 is nested in a graduation groove 153, the pin 138 is prevented from pivoting.

When the arm 150 has been repositioned, the user releases the head 159 and the pointed end 156 seats in a graduation groove 153 which corresponds to the indicium at the new position of adjustment. Swinging the adjusting arm 150 into another position causes the pin 138 to pivot and the arm 135 is caused in turn to pivot to reposition the pivot pin 130. Repositioning of the pivot pin 130 will cause the abutment face 127 of the operating arm 126 to move either toward or away from the pin 92 in one or another longitudinal directions depending upon the direction that the arm 150 is pivoted. It is readily apparent, therefore, that when the abutment face 127 of the operating member 126 is longitudinally repositioned so that it is nearer to or further from the pin 92 of the flow-responsive element 70, a lesser or greater movement, as the case may be, of the flow-responsive element 70 is required to actuate the operating member 126 to in turn actuate the movable valve element 97 of the bleed valve 96.

By a construction not shown, the arm 150 is capable of being remotely controlled as for example from the cab of a fire-fighting truck.

The operation of the flow system to the embodiment of FIGURES 1 through 7 is as follows. Assume that the valves 25', 54, are open and that the pump 31 is in operation. The pump 31 causes suction to be created and maintained in the passage means 22 and positive fluid pressure to exist in passage means 24. A slight downstream suction is sufficient to overcome the urging force of the spring 71. When the flow-responsive element 70 is caused to clear the port 64, the fluid medium from the source of supply in the tank 26 will be drawn through the conduit 25, across the port 64, through the flow area FA between the periphery of the head 72 of the flow-responsive element 70 and the frusto-conical passage portion 65. The fluid medium will continue to be drawn through the passage 61, through the conduit 29, and through the inlet connection 30 into the pump 31. At the time the head 72 clears the port 74, registration of the ports 68' and 68" of the valve body 68 and the respective ports 75' and 75" of the valve element 75 commences. Since the valve 54 is open and the valve 55 is closed, the fluid medium from the second fluid medium supply source in the tank 49 will flow through the T-fitting 50, through the conduit 52 into the passage 66' of the conduit member 66, through the port 68' in the valve body 68, through the port 75' in the valve element 75, into the passage 75''', and through the discharge opening 80 into the passage 29' of the conduit 29. As the head 72 moves increasingly away from the port 64, increased registration of the pairs of ports 75' and 68' and 75" and 68" occurs. These pairs of ports are of a configuration that the flow through either one or both pairs is volumetrically proportional to the flow through the flow area FA over the operating range. As the first fluid medium and the second fluid medium meet in the passage 29', some mixing occurs to form a foam mixture. When the foam mixture passes through the pump 31, it is compressed and mixed with a gaseous fluid such as air. After the foam mixture is discharged through the discharge port 38 of the pump 31, it flows through the passage means 24 and then through the nozzle 41 of the turret 40.

While the fluid flow as sensed by the flow-responsive element 70 is below the preselected level at which the adjusting arm 150 is set, the lost-motion connection LM prevents the pin 92 from exerting a force upon and consequently moving the abutment face 127 of the operating member 126.

Should the user increase the downstream suction in the passage means 22, for example by increasing the speed of rotation of the shaft 34 of the pump 31, and should the preselected flow level as sensed by the flow-responsive element 70 be exceeded, the pin 92 will engage and move the abutment face 127 of the operating member 126 so as to open the bleed valve 95. As the pin 92 progresses further to the right as shown in FIGURES 2, 4, and 5 as the flow-responsive element 70 senses increasing fluid flow, the movable valve element 97 is progressively pivoted to progressively open the bleed valve 95. Because of the leverage exerted by the operating member 126, a relatively small movement of the pin 92 causes a relatively great movement of the movable valve element 97 of the bleed valve 95. Consequently, the fluid flow through the passage means 22 is substantially instantaneously reduced to the preselected level. The passage 96" through which ambient atmosphere passes into the passage means 22 is large enough so that the fluid flow is capable of being set at various limits over a wide range of limits. The leverage is great because the operating member 126 exerts a force on the valve element 97 at a short distance from the pin 98 and because of the location of the pivot pin 130 below the midpoint of the operating member 126.

A decrease in fluid flow will cause the flow-responsive element 70 to move progressively toward the port 64. Consequently, the pin 92 of the flow-responsive element 70 will cause the movable valve element 97 to pivot progressively toward the fully closed position shown in FIGURE 3. Should the fluid medium flow be diminished even further, the pin 92 will lose contact with the abutment face 127 and the movable valve element 97 will be urged into and be held in the fully closed portion by the tension spring 112.

Should the movable valve element 97 have moved to the fully open position against the action of the spring 112, as shown by the phantom lines PL of FIGURE 5, and should the flow-responsive element 70 sense a further increase in flow, the flow-responsive element 70 will overtravel. This excess travel or overtravel exists relative to the movable valve element because further movement of the movable valve element 97, clockwise in FIGURE 5 for example, would serve to reduce the flow of the atmospheric air through the passage 96" and perhaps damage the mechanism. The mounting mechanism 136 serves to yieldably mount the pivot pin 130, and the pivot pin 130 will shift when the force transmitted to it by the operating member 126 is great enough to overcome the urging action of the spring 147. The spring 147 yields to allow the abutment face 127 of the operating arm 126 to travel longitudinally without further movement of the valve element 97. In particular, as the pin 92 and consequently the abutment face 127 overtravel, the spring 147 yields to enable the arm 135 of the mounting mechanism 136 to pivot counterclockwise, as viewed in FIGURE 5 for example. Should the upper end of the operating member 126 be pivoted until it strikes the inner surface 96' of the valve body 96, the mounting mechanism would continue to yield against the action of the spring 147 to obviate damage to any of the components of the bleed mechanism 94.

Should it be desired to adjust the flow of the fluid medium from the fluid medium supply source in the tank 26 through the passage means 22 to a different selected level, the user pulls on the head 159 of the screw 155 to overcome the urging force of the spring 157 to an extent sufficient to move the pointed end 156 out of the graduation groove 153. The adjusting arm 150 is then adjusted to the desired selected flow and the head 159 is then released so that the pointed end 156 becomes nested in graduation groove 153 corresponding to the flow at the newly selected position. Movement of the adjustment arm 150 will cause the pin 138 to rotate in the bore 139, and the arm 135 which follows the arm 145 due to the urging action of the spring 147 will cause the pivot pin 130 to be shifted in one direction or the opposite direction depending upon the direction the adjusting arm 150 is actuated. Shifting of the pivot pin 130 will effect a change in the longitudinal position in the face 127 with respect to the pin 92, so it is readily apparent that the amount of lost motion of the lost-motion connection LM is capable of being varied. Assuming that the face 127 is repositioned toward the pin 92 with reference to FIGURE 3 of the illustrative drawings, the pin 92 will have to travel a lesser distance before it engages the face 127 and consequently the movable valve element 97 will be actuated in response to a lesser flow of the fluid medium.

Referring now to the embodiment of FIGURES 8 and 9 of the illustrative drawings, the same references are employed to designate components having the same construction, function and relative location as employed in the embodiment of FIGURES 1 through 7, with the addition of letter "a." There is shown in the embodiment of FIGURES 8 and 9 an operating mechanism generally indicated at 160. The operating mechanism 160 is shown to include a first operating member 161 and a second operating member 162, each of which is pivoted at one end about a common pivot pin 163. The operating member 161 is shown to pass through an aperture 128a at its other end, while the operating member 162 is shown to have an abutment face 164 at its other end. The abutment face 164 is engageable by a pin 92a of a flow-responsive element 70a. A spiral spring 165 is shown to have one end 166 hooked partially around the operating member 161 and to have the other end 167 hooked partially around the operating member 162. The operating member 162 has an arm 168 which has an abutment face 169 acting against the operating member 161 so that normally the operating members 161 and 162 pivot about the pivot pin 163 as a unit. When the movable valve element 97a has been moved by the operating member 161 against the action of a spring 112a into its full open position and assuming that the flow-responsive element 70a and its pin 92a overtravel and consequently exert an excess force against the abutment face 164, the urging force of the spring 165 will be overcome to pivot the operating member 162 about the pivot pin 163 relative to the operating member 161. Therefore, the operating member 162 can yield until it strikes the housing 60a, at the junction of the bore 109a and the passage 61a. The pivot pin 163 is fixably mounted to a link 171 by a set screw 172. The valve body 96a is provided with a boss 177 having a bore 178 through which a shaft or pin 173 extends. An adjusting arm 150a is connected to the pin 173 by a set screw 151a. A plate 152a having graduation grooves like that shown in the embodiment of FIGURES 1 through 7 is also provided. A retainer 175 engages the inner surface 96a' of the valve body 96 and is held in place by a set screw 176 which bears against the pin 173.

The construction and operation of the embodiment of FIGURES 8 and 9 is identical to that of the embodiments of FIGURES 1 through 7, the only exception being that in the embodiment of FIGURES 8 and 9, two operating members 161 and 162 are provided, and upon overtravel of the pin 92a of the flow-responsive element 70a the operating member 162 alone will overcome the urging force of the spring 165 to pivot in a counterclockwise direction as viewed in FIGURE 8.

In the embodiment of FIGURES 10 and 11, like reference characters are employed to designate components having the same construction, function and relative location as employed in the embodiment of FIGURES 1 through 7, with the addition of letter "b." There is shown in FIGURES 10 and 11 a fragmentary portion of a flow-responsive element generally indicated at 70b including a pin 92b movable along a longitudinal slot 91b in a valve body 68b. A cam generally indicated at 180 is shown to be fixedly secured to the pin 92b by a set screw 181. The cam 180 is shown to have parallel dwell portions 182 and 182' joined by an inclined portion 183. The cam 180 has a pair of spaced guide walls 184 and 185 which run along both sides of the dwell and inclined portions 182, 182', and 183, respectively.

There is also shown in the embodiment of FIGURES 10 and 11 a bleed valve generally indicated at 186. The bleed valve 186 is shown to include a tubular valve body 187 having an inner surface 187' which defines a passage 187". At the upper marginal end of the valve body 187 there are provided external threads 188 which are shown to engage internal threads 189 of an annular seat member 190. The seat member 190 is shown to have an internal flange 191 terminating at a relatively large central opening 192. The upper surface of the internal flange 191 defines a valve seat 191'. A movable valve element 193 is shown in FIGURE 10 to be seated against the valve seat 191' to close off the opening 192.

The seat member 190 is shown to have an external continuous annular pointer 194. A scale 195 having graduations 196 opposite the pointer 194 is shown to be secured to an annular ring 197 which encircles the valve body 184. A set screw 198 holds the ring 197 in the calibrated position.

The upper marginal end of the valve body 187 at the inner surface 187' is internally threaded to receive a spider generally indicated at 199. The spider has a plurality of openings 200, only one of which is shown. A guide 201, welded to the spider 199, has a bore 202 which is axially aligned with a central bore 203 in the spider 199. The guide 201 is shown to extend to a substantial distance below the spider 199. An operating mechanism generally indicated at 204 is shown to include an operating member 205 having a roller follower 206 pivotally mounted on a pivot pin 207. The roller follower 206 is shown in FIGURE 10 to be near the beginning of the inclined portion 183 and is shown in FIGURE 11 to be on the dwell portion 182'.

A collar 208 is secured to the operating member 205 above the roller follower 206 by set screw 209. A compression spring 210 is shown to be in abutment at one end with a terminal end 211 of the guide 202 and with the collar 208 at the other end. It is readily apparent that the compression spring 210 serves to constantly urge the roller follower 206 against either the dwell portions 182, 182' or the inclined portion 183 of the cam 180. The operating member 205 is free to slide within the bores 203 and 202 of the spider 199 and the guide 201, respectively. A collar 212 is shown to be secured to the upper end of the operating member 205 by a set screw 213. As shown in FIGURE 10 of the illustrative drawings, the movable valve element 193 is shown to be spaced slightly above the collar 212. On the other side of the movable valve element 193 and spaced therefrom is a retainer in the form of a collar 114 secured to the operating member 205 by a set screw 215. The collar 214 and set screw 215 serve only to prevent accidental loss of the movable valve element 193. Follower 206 is free to ride along the dwell portions 182 and 182' without any upward movement being imparted to the roller following 206 or the operating member 205. However, when the roller follower 206 begins to ride up the inclined portion 183, the movable operating member 205 is caused to move upwardly. In FIGURE 11, it is seen that the movable valve element 193 has been lifted upwardly by the collar 212 to its maximum extent so that the valve 186 is in the fully open position. Ambient atmosphere is then free to pass between the valve seat 191' and the movable valve element 193, through the opening 192, into the passage 187" and into the passage 61b. When it is desired to change the rate of fluid flow through the passage 61b, the seat member 190 is adjusted so as to change the position of the seat 191' relative to the collar 112. For example, as the seat member 190 is threaded so that it moves upwardly from the position shown in FIGURES 10 and 11, the roller follower 206 will be required to travel further up the inclined portion 183 before the collar 212 begins to lift the movable valve element 193 from its seat 191'. It is readily apparent that the adjustment can be made without disassembling the valve 186, but it is equally apparent that an adjustment can be made by loosening the set screw 213 and moving the collar 212 to the position shown by phantom lines PL' in FIGURE 10 and then retightening the set screw 213; however, the valve would have to be recalibrated by changing the position of the ring 197.

The construction and operation of the embodiment of FIGURES 10 and 11 is basically the same as in the embodiment of FIGURES 1 through 7 with the following differences. When the pin 92b which carries the cam 180 is actuated to the right as viewed in FIGURES 10 and 11, the roller follower 206 will ride along the dwell portion 182. Continued movement to the right will cause the roller follower 206 to ride up the inclined portion 183 to move the operating member 205 upwardly. The collar 212 lifts the movable valve element 193 only when the operating member 205 has moved upwardly a sufficient distance. The connection between the collar 212 and the movable valve element 193 is properly termed a lost-motion connection LMb because motion of the operating member 205 is lost until the collar 212 lifts the movable valve element 193. The connection between the dwell portion 182 of the cam 180 and the roller follower 206 is also a lost-motion connection generally indicated at LMb'. In the event it should be desired to use only the lost-motion connection LMb, the cam 180 would have an inclined portion over its entire length (not shown). In the event it should be desired to use only the lost-motion connection LM$b'$, the collar 212 would be positioned in abutment with the movable valve element 193. In either event, recalibrating the position of the scale 195 relative to the pointer 194 by moving the ring 197 would be necessary. When the operating member 205 has moved sufficiently for the collar 212 to lift the movable valve element 193 from its valve seat 191′, atmospheric air will be bled through the opening 192. The air passes into the passage 187″ and into the conduit system of which the passage 61$b$ forms a part. The suction in the passage 61$b$ is consequently reduced and the flow through the passage 61$b$ of the fluid medium from its source is likewise reduced. Should the pin 92$b$ continue its movement to the right to the position shown in FIGURE 11, the movable valve element 193 will continue to be lifted until the roller follower 205 rides on the dwell portion 182′. A reduction in fluid flow will cause the flow-responsive element 70$b$ to move to the left as viewed in FIGURES 10 and 11 so that the roller follower 206 and consequently the operating member 205 will be caused to descend. The descent of the operating member 205 and the collar 212 which is secured thereto will also cause the movable valve element 193 to descend, thus closing the gap between the movable valve element 193 and the valve seat 191′ so that a lesser amount of ambient atmosphere will pass into the passage 187″.

In the embodiment of FIGURES 12 and 13, like reference characters are employed to designate components having the same construction, function and relative location as employed in the embodiment of FIGURES 1 through 7, with the addition of letter "$c$."

There is shown in FIGURES 12 and 13 a flow system generally indicated at 20$c$. The flow system 20$c$ includes intake conduit means generally indicated at 23$c$. Conduit means 21$c$ leads to a rotary vane-type pump 31$c$, while the conduit means 23$c$ leads away from the pump 31$c$. A flow control device 28$c$ forms a part of the intake conduit means 21$c$ when connected as shown in FIGURE 12. The device 28$c$ includes a housing 60$c$ having a passage 61$c$. The conduit means 21$c$ has passage means generally indicated at 22$c$, while the conduit means 23$c$ has passage means generally indicated at 24$c$. The conduit means 21$c$ leads from a suitable source of fluid medium supply S for example a tank (not shown), while the conduit means 23$c$ leads to a nozzle like that shown in FIGURE 1. The flow control device 28$c$ is identical to that shown in the embodiment of FIGURES 1 through 7 except that no bleed valve is mounted on the housing 60$c$. Like in the embodiment of FIGURES 1 through 7, conduits 52$c$ and 53$c$ having valves (not shown) lead from a second fluid medium supply source in, for example, a tank (not shown). A pin 92$c$ merely serves to guide the flow-responsive element 70$c$ and prevent its rotation and is not employed for any additional function. The conduit means 21$c$ is provided with an inlet conduit 220 which is connected by a flange 221 to the housing 60$c$. The conduit 220 has an elbow portion 222 having an aperture 223. A guide 224 suitably secured to the outside of the elbow portion 222 has a bore 225 aligned with the aperture 223 in the elbow portion 222. As best shown in FIGURE 13, there is provided a gaseous fluid bleed valve generally indicated at 226. The bleed valve 226 includes a seat member 227 having internal threads 227′ and a movable valve element 228. The underside of the movable valve element 228 is shown to bear against a valve seat 229 of the seat member 227. The other side of the movable valve element 228 has an annular flange 230 which serves to define a recess 231. One end of a light compression spring 232 is nested in the recess 231, while the other end of the compression spring 232 bears against the guide 224. The spring 232 serves to urge the movable valve element 228 against the valve seat 229 of the seat member 227. The seat member 227 is threadably received by a valve body 233. The valve body 233 has a gaseous fluid inlet duct 234 formed integrally therewith which is shown to be connected to a conduit 235 which joins the device 28$c$ and the pump 31$c$. The air inlet duct 234 is of a character to be connected to the conduit 220, if desired. When the flow-responsive element 70$c$ senses fluid medium flowing from the source S, the flow-responsive element 70$c$ will be actuated to the right as viewed in FIGURE 12 of the illustrative drawings. An operating member 236 is suitably connected at one end to the flow-responsive element 70$c$ and passes through the aperture 223, the bore 225 and the aperture 237 in the movable valve element 228. A collar 238 is secured through the operating member 236 within the passage 233″ by a set screw 239. The collar 238 is shown in FIGURE 13 to be spaced from the movable valve element 228 to define a lost-motion connection LM$c$. Movement of the flow-responsive element 70$c$ in response to the fluid medium flowing through the passage 61$c$ causes the operating member 236 to be moved toward the right as viewed in FIGURES 12 and 13. When the collar 238 exerts a sufficient force on the underside of the movable valve element 228 to overcome the force exerted by the light spring 232, the movable valve element 228 will be moved away from the valve seat 229, so that ambient atmosphere is bled into the passage 223″. An arm 240 having graduations 241 therealong is shown to have an annular ring 242 which encircles the valve body 233. A set screw 243 serves to hold the collar 242 in position. Should it be desired to limit the flow to another preselected level, the seat member 227 is threaded in one or another direction to selectively move the seat member 227 to increase or decrease the distance between the valve seat 229 and the collar 238 to thereby consequently increase or decrease the distance the collar 238 must travel before the movable valve element 228 is lifted from the valve seat 229. A bracket 244 is shown to rigidly secure the conduit 220 and the duct 234 against relative movement.

The operation of the flow system 20$c$ of the embodiment of the FIGURES 12 and 13 is now to be described. Assuming that the pump 31$c$ causes a sufficient suction and consequently flow of the flow medium from the source S, the movable valve element 70$c$ will be caused to move away from a port 64$c$ of the device 28$c$. The operating member 236 which is secured to the movable element 70$c$ will move along with the flow-responsive element 70$c$. When the collar 238 exerts a force upon the movable valve element 228 against the urging force of the light spring 232, ambient atmosphere will be bled into the passage 233″ from between the movable valve element 228 and the valve seat 229. The ambient atmosphere will pass through the duct 234 into the conduit 235. Bleeding air into the conduit means 21$c$ will cause a reduction in suction in the passage means 22$c$. Consequently, the flow-responsive element 70$c$ will move toward the port 64$c$ and the collar 238 on the operating member 236 will be caused to move to the left as viewed in FIGURES 12 and 13 of the illustrative drawings. The seat member 227 is turned when it is desired to adjust the distance between the valve seat 229 and the collar 238. Assuming that the seat member 227 is actuated to cause the valve seat 229 to be disposed at a greater distance from the collar 238, it is readily apparent that the collar 238 will be required to move through a greater distance before the movable valve element 228 is unseated from the valve seat 229.

In the embodiment of FIGURES 14 and 15, like reference characters are employed to designate those components having the same construction, function and relative location as employed in the embodiment of FIGURES 1 through 7, with the addition of letter "$d$." Referring now in particular to FIGURES 14 and 15, there is shown a flow system generally indicated at 20$d$. The flow system 20$d$ includes intake conduit means generally indicated at 21$d$ leading from a fluid medium supply source S to a rotary vane type pump 31$d$, while discharge conduit means generally indicated at 23d leads from the pump 31d to a nozzle like that shown in FIGURE 1. The intake conduit means 21d is shown to have passage means generally indicated at 22d while the discharge conduit means 22d is shown to have passage means generally indicated at 24d. There is shown a flow control device 28d having a passage 61d and a flow-responsive element 70d movable in the passage 61d. When the device 28d is connected as shown in FIGURE 14 of the illustrative drawings, the passage 61d forms part of the passage means 22d.

The conduit means 21d includes a conduit 250 connected at one end to the device 28d and at the other end to the pump 31d. The conduit 250 has an elbow 251 forming a part thereof. The elbow 251 has a cut-out portion 252 at its large radius to which there is welded a valve body 253 of an air bleed valve generally indicated at 245. The valve body 253 terminates at a valve seat 253'. Seated against the valve seat 253' is a movable valve element 255 having an annular flange 256 which defines a cup 256'. The movable valve element 255 has a central aperture 256 therein. An operating member 257 is connected at one end to a flow-responsive element 70d and passes through the aperture 256, through the movable valve element 255 and through a cup-shaped keeper 258. A marginal end 259 of the operating member 257 is threaded, and nuts 260 and 261 straddle the keeper 258 and hold it in position. A light compression spring 262 is nested at one end in the cup 256' and at the other end in the cup-shaped keeper 258. A collar 263 is secured to the operating member 257 by a set screw 264. The collar 263 is disposed in a passage 253" of the valve body 253 and is spaced from the movable valve element 255, in the position shown in FIGURES 14 and 15 to define a lost-motion connection LMd. Threadably secured to the end of the operating member 257 is a pointer 265 which points to graduations 266 on a scale 267. The scale 267 is secured to an arm 268 having an elongated slot 269. A bolt 270 passes through the elongated slot 269 and is threaded into the valve body 253.

It is of advantage, in using of the present invention, to be able to vary the expansion ratio of the foam which is produced. Let it be assumed that an expansion ratio of, for example, eight-to-one is utilized to reduce a blaze to one or more small localized fires. To conserve the supply of water, the expansion ratio of the foam can be changed quickly to, for example, fifteen-to-one by setting the bleed valve to bleed more ambient atmosphere into the system. This reduces the amount of liquid drawn into the pump. The pump is operated to create sufficient pressure to discharge the foam the required distance although the foam now has a higher expansion ratio. The localized fires can be extinguished with the higher expansion ratio foam and at the same time the water supply is conserved.

Other embodiments and modifications of this invention will suggest themselves to those skilled in the art and all such of these as come within the spirit of this invention are included within its scope as defined by the appended claims.

We claim:

1. A flow control device for use in a flow system, said flow control device including a housing having a passage, flow-responsive means disposed in said passage for responding to a change in fluid medium flow, said flow-responsive means including a flow-responsive element, fluid bleed valve for selectively bleeding gaseous fluid into said passage, and means responsive to said flow-responsive element after sufficient movement of said flow-responsive element for operating said bleed valve to limit the fluid medium flow to a preselected level, said operating means including a lost-motion connection adapted and arranged so that the suction in said passage is limited to consequently limit fluid medium flow.

2. A flow control device for use in a flow system, said flow control device including a housing having a longitudinal passage, flow-responsive means movably disposed in said passage for responding to changes in fluid medium flow, said flow-responsive means including a flow-responsive element, a fluid bleed valve for selectively bleeding gaseous fluid into said passage, operating means responsive to said flow-responsive element for operating said bleed valve to limit the fluid medium flow to a preselected level, said operating means including an abutment face, means for adjusting said abutment face in a generally longitudinal direction with respect to said flow-responsive element, and a lost-motion connection between said flow-responsive element and said operating means.

3. A flow control device for use in a flow system, said flow control device including a housing having a passage, flow-responsive means movably disposed in said passage for responding to changes in fluid medium flow, said flow-responsive means including a movable flow-responsive element, a fluid bleed valve for selectively bleeding gaseous fluid into said passage, said bleed valve having a valve element movable between a fully closed position and a fully open position, operating means responsive to said flow-responsive element after sufficient movement of said flow-responsive element for operating said movable valve element of said bleed valve, said operating means including a pivot pin and an operating member pivotally mounted on said pivot pin, said operating member being operatively connected at one end to said movable valve element and being engageable at its other end with said flow-responsive element, and means for yieldably mounting said pivot pin.

4. A flow control device for use in a flow system, said device including a housing having a passage, flow-responsive means disposed in said passage for responding to changes in fluid medium flow, said flow-receiving means including a movable flow-responsive element, a fluid bleed valve for selectively bleeding gaseous fluid into said passage, operating means responsive to said flow-responsive element for operating said bleed valve to limit the fluid medium flow to a preselected level, means for adjusting said operating means to respond to a selectively increased and decreased amount of movement of said flow-responsive element, said adjusting means including an adjusting arm, and means for holding said adjusting arm in its adjusted position.

5. A flow control device for use in a flow system, said device including a housing having a longitudinal passage leading to a first fluid medium supply source, flow-responsive means disposed in said passage for responding to changes in fluid medium flow, said flow-responsive means including a movable flow-responsive element having a movable valve element, said valve element having a port and a discharge opening, a valve body having a bore, said valve element being guided for longitudinal movement in said bore, a port in said valve body leading out of said housing, said port in said valve element being brought into increased registry with said port in said valve body when said flow-responsive element senses an increase in fluid medium flow through said passage and said port in said valve element being brought into decreased registry with said port in said valve body when said flow-responsive element senses a decrease in fluid medium flow through said passage, said ports being dimensioned to provide flow therethrough from a second fluid medium supply sorce in volumetric proportion to the fluid medium flowing through said passage, an elongated guide slot in said guide, a pin secured to said valve element and passing through said elongated slot, a fluid bleed valve for bleeding gaseous fluid into said passage, and operating means responsive to said pin after sufficient movement for operating said bleed valve.

6. A flow control device for use in a flow system, said flow control device including a housing having a longitudinal passage, said housing having a port, flow-responsive means disposed in said passage for responding to a change in fluid medium flow, said flow responsive means including a movable flow-responsive element, said flow-responsive element being movable away from said port in response to an increase in fluid medium flow to provide an increased flow area and movable toward said port in response to a decrease in fluid medium flow to provide a decreased flow area, said flow-responsive element having a valve element, said valve element having a port and a discharge opening, a valve body having a bore, said valve element being guided for longitudinal movement in said bore, a port in said valve body opening to the outside of said housing, said port in said valve element being brought into increased registry with said port in said valve body when said flow-responsive element senses an increase in fluid medium flow through said passage and said port in said valve element being brought into decreased registry with said port in said valve body when said flow-responsive element senses a decrease in fluid medium flow through said passage, said ports being dimensioned to provide fluid medium flow from a second fluid medium supply source in proportion to the fluid medium flow through said passage, a fluid bleed valve for selectively bleeding gaseous fluid into said passage, and operating means responsive to said flow-responsive element after sufficient movement of said flow-responsive element for operating said bleed valve.

7. In a flow system, conduit means leading from a fluid medium supply source, said conduit means having passage means, means for creating a suction connected to said conduit means to draw a fluid medium through said passage means, flow-responsive means disposed in said passage means for responding to a change in fluid medium flow, said flow-responsive means including a movable flow responsive element, said flow-responsive element having a valve element, said valve element having a port and a discharge opening, a valve body having a bore, said valve element being guided for longitudinal movement in said bore, a port in said valve body opening to the outside of said housing, said port of said valve element being brought into increased registry with said port in said valve body when said flow-responsive element senses an increase in fluid medium flow through said passage means and said port in said valve element being brought into decreased registry with said port in said valve body when said flow-responsive element senses a decrease in fluid medium flow through said passage means, said ports being dimensioned to provide fluid medium flow from a second fluid medium supply source in volumetric proportion to the fluid medium flow through said passage means, a fluid bleed valve for selectively bleeding gaseous fluid into said passage, and operating means responsive to said flow-responsive element after sufficient movement for operating said bleed valve.

8. A flow control device for use in a flow system, said flow control device including a housing having a longitudinal passage, said housing having a port, flow-responsive means disposed in said passage for responding to a change in fluid medium flow, said flow-responsive means including a movable flow-responsive element, said flow-responsive element being movable away from said port in response to an increase in fluid medium flow to provide an increased flow area and movable toward said port in response to a decrease in fluid medium flow to provide a decreased flow area, said flow-responsive element having a valve element, said valve element having a port and a discharge opening, a valve body having a bore, said valve element being guided for longitudinal movement in said bore, a port in said valve body opening to the outside of said housing, said port in said valve element being brought into increased registry with said port in said valve body when said flow-responsive element senses an increase in fluid medium flow through said passage and said port in said valve element being brought into decreased registry with said port in said valve body when said flow-responsive element senses a decrease in fluid medium flow through said passage, said ports being dimensioned to provide fluid medium flow from a second fluid medium supply source in proportion to the fluid medium flow through said passage, a fluid bleed valve for selectively bleeding gaseous fluid into said passage, and operating camming means responsive to said flow-responsive element including a lost-motion camming surface for operating said bleed valve only after sufficient initial movement of said flow-responsive element.

References Cited

UNITED STATES PATENTS

| 1,102,303 | 7/1914 | Sly | 137—480 |
| 1,640,552 | 8/1927 | Nelson | 137—480 |
| 3,141,471 | 7/1964 | Williamson | 137—114 |

FOREIGN PATENTS 490,224  12/1918  France.

M. CARY NELSON, *Primary Examiner.*

A. ROSENTHAL, E. K. FEIN, *Assistant Examiners.*